United States Patent
Bovino

(10) Patent No.: US 8,903,094 B2
(45) Date of Patent: Dec. 2, 2014

(54) CRYPTOGRAPHIC KEY DISTRIBUTION SYSTEM

(75) Inventor: Fabio Antonio Bovino, Rome (IT)

(73) Assignee: Selex Sistemi Integrati S.p.A. (IT)

( * ) Notice: Subject to any disclaimer, the term of this patent is extended or adjusted under 35 U.S.C. 154(b) by 166 days.

(21) Appl. No.: 13/566,456

(22) Filed: Aug. 3, 2012

(65) Prior Publication Data
US 2013/0208894 A1     Aug. 15, 2013

(30) Foreign Application Priority Data
Aug. 5, 2011 (IT) ................. TO2011A0733

(51) Int. Cl.
*H04L 9/32* (2006.01)
*H04L 9/08* (2006.01)

(52) U.S. Cl.
CPC ............ *H04L 9/0883* (2013.01); *H04L 9/0852* (2013.01); *Y10S 977/933* (2013.01)
USPC ........... 380/278; 380/255; 380/256; 380/273; 380/277; 713/163; 713/169; 713/171; 713/176; 713/181; 726/4; 726/14; 726/26; 398/37; 398/130; 977/933

(58) Field of Classification Search
CPC .... H04L 9/0883; H04L 9/0852; H04L 9/0855
USPC ........................................................ 380/278
See application file for complete search history.

(56) References Cited

U.S. PATENT DOCUMENTS

| | | | | |
|---|---|---|---|---|
| 5,737,419 | A * | 4/1998 | Ganesan ........................ | 713/169 |
| 7,457,416 | B1 * | 11/2008 | Elliott .......................... | 380/256 |
| 7,697,693 | B1 * | 4/2010 | Elliott .......................... | 380/278 |
| 2004/0184603 | A1 * | 9/2004 | Pearson et al. ................. | 380/28 |
| 2005/0286723 | A1 * | 12/2005 | Vig et al. ...................... | 380/278 |
| 2006/0056630 | A1 * | 3/2006 | Zimmer et al. ................ | 380/256 |
| 2007/0071245 | A1 * | 3/2007 | Kuang .......................... | 380/278 |
| 2007/0076884 | A1 * | 4/2007 | Wellbrock et al. ............ | 380/263 |
| 2007/0206799 | A1 * | 9/2007 | Wingert et al. ............... | 380/285 |

(Continued)

FOREIGN PATENT DOCUMENTS

WO      2007123869      11/2007

OTHER PUBLICATIONS

Bechmann-Pasquinucci H et al., "Quantum key distribution with trusted quantum relay," May 2001, pp. 1-13.
Corresponding Italian Search Report dated Feb. 24, 2012.

*Primary Examiner* — Morshed Mehedi
*Assistant Examiner* — Sharon Lynch
(74) *Attorney, Agent, or Firm* — The Belles Group, P.C.

(57) ABSTRACT

The invention concerns a cryptographic key distribution system comprising a server node, a repeater network connected to the server node through a quantum channel, and a client node connected to the repeater network through a quantum channel; wherein in use: the repeater network and the client node cooperatively generate a transfer quantum key which is supplied to a system subscriber by the client node; the server node and the repeater network cooperatively generate a link quantum key; the repeater network encrypts the link quantum key based on the transfer quantum key and sends the encrypted link quantum key to the system subscriber through a public communication channel; the server node encrypts a traffic cryptographic key based on the link quantum key and a service authentication key and sends the encrypted traffic cryptographic key to the system subscriber through a public communication channel.

10 Claims, 1 Drawing Sheet

(56) References Cited

U.S. PATENT DOCUMENTS

| | | | |
|---|---|---|---|
| 2008/0008320 A1* | 1/2008 | Hinton et al. | 380/263 |
| 2008/0013738 A1* | 1/2008 | Tajima et al. | 380/278 |
| 2009/0097862 A1* | 4/2009 | Munro et al. | 398/175 |
| 2009/0175452 A1* | 7/2009 | Gelfond et al. | 380/277 |
| 2009/0262942 A1* | 10/2009 | Maeda et al. | 380/278 |
| 2009/0298576 A1* | 12/2009 | Nguyen | 463/25 |
| 2010/0293380 A1* | 11/2010 | Wiseman et al. | 713/169 |
| 2010/0299526 A1* | 11/2010 | Wiseman et al. | 713/171 |
| 2010/0310072 A1* | 12/2010 | Michaels et al. | 380/263 |
| 2011/0213979 A1* | 9/2011 | Wiseman et al. | 713/171 |
| 2011/0228937 A1* | 9/2011 | Wiseman et al. | 380/255 |
| 2011/0231665 A1* | 9/2011 | Wiseman | 713/181 |
| 2011/0317836 A1* | 12/2011 | Yeh et al. | 380/256 |
| 2012/0002968 A1* | 1/2012 | Luo et al. | 398/81 |
| 2012/0148237 A1* | 6/2012 | Harrison et al. | 398/37 |
| 2012/0177201 A1* | 7/2012 | Ayling et al. | 380/278 |
| 2013/0101121 A1* | 4/2013 | Nordholt et al. | 380/279 |
| 2013/0308956 A1* | 11/2013 | Meyers et al. | 398/130 |

\* cited by examiner

CRYPTOGRAPHIC KEY DISTRIBUTION SYSTEM

CROSS REFERENCE TO RELATED APPLICATIONS

This application claims priority under 35 U.S.C. §119 to Italian Patent Application No. TO2011 A 000733, filed Aug. 5, 2011, the entirety of which is hereby incorporated by reference.

FIELD OF THE INVENTION

The present invention relates, in general, to a cryptographic key distribution system, and in particular, to a cryptographic key distribution system based on quantum key distribution.

BACKGROUND OF THE INVENTION

As is known, Quantum Key Distribution (QKD) is a technique based on the principles of quantum mechanics that enables two communication devices connected to each other by means of a quantum channel to generate a random cryptographic key, called quantum key, which can be used by said communication devices, or by the users of said communication devices, to communicate with each other in a secure manner over a public channel, or rather over an eavesdroppable channel, for example a connection via the Internet.

In general, the quantum channel comprises a quantum link, for example a link via optical fibre or in free space, and a conventional, or rather non-quantum, link, such as a connection via the Internet.

QKD provides that a series of quantum states, usually in the form of photons, is transmitted on the quantum channel, in particular over the quantum link of the quantum channel, in order to generate a quantum key common to the two communication devices.

In particular, QKD provides that the two communication devices perform the following operations:
  they measure specific properties, for example the polarization plane, of the photons transmitted over the quantum link of the quantum channel;
  they exchange, over the conventional link of the quantum channel, information related to the measurements carried out; and
  they generate one and the same quantum key on the basis of the measurements carried out and of the information exchanged over the conventional link of the quantum channel.

As is known, traditional cryptographic key distribution protocols do not permit detecting whether the distributed cryptographic keys have been eavesdropped. In particular, traditional cryptographic key distribution protocols do not permit discovering whether a cryptographic key distributed before starting an encrypted communication based on said cryptographic key has been eavesdropped, for example by means of a "man in the middle" attack.

On the contrary, QKD enables detecting if someone has attempted to abusively eavesdrop the quantum key. In particular, QKD not only enables detecting whether or not someone has abusively eavesdropped any exchanged information and/or any photons transmitted over the quantum channel during the generation of the quantum key, but also enables avoiding that the eavesdropped information could be used to trace the quantum key.

BB84 protocol is a known QKD algorithm that was described for the first time by C. H. Bennett and G. Brassard in "*Quantum cryptography: Public key distribution and coin tossing*", Proc. of the IEEE Int. Conf. on Computers, Systems & Signal Processing, Bangalore, India, Dec. 10-12, 1984, pp. 175-179.

In particular, the BB84 protocol enables two communication devices connected to each other by means of a quantum channel that comprises a quantum link and a conventional link, i.e., a non-quantum link, to generate a secure binary quantum key. Neither of the two links needs to be a secure connection; in fact, the BB84 protocol is also designed to take into account possible interference, in any form, with both of the links by an unauthorized third party.

In the following, the two communication devices will be called device A and device B for the sake of description simplicity.

In particular, according to the BB84 protocol, the device A transmits a series of quantum states to the device B over the quantum channel, specifically over the quantum link of the quantum channel, in the form of photons opportunely polarized to encode binary information. The polarizations of the transmitted photons can be defined according to two distinct bases, for example a first base + that comprises the orthogonal polarizations 0° and 90° and a second base × that comprises the orthogonal polarizations 45° and 135°.

In detail, according to the BB84 protocol, the device A performs the following operations:
  it generates a random sequence of bits; and,
  for each generated bit,
    it randomly selects a respective base,
    it transmits, over the quantum channel, specifically over the quantum link of the quantum channel, a respective photon polarized according to the respective selected base to encode said bit, and
    it stores said bit, the respective selected base and the time instant when the respective photon is transmitted.

An example of how the photons transmitted over the quantum channel can be polarized to encode 0 or 1 in the two bases + and × is provided in the table below.

TABLE

| BASE | 0 | 1 |
|------|-----|------|
| +    | 0°  | 90°  |
| ×    | 45° | 135° |

Moreover, for each photon received over the quantum channel, specifically over the quantum link of the quantum channel, the device B performs the following operations:
  it randomly selects a respective base;
  it measures the polarization of the received photon using the respective selected base;
  it determines the bit encoded by the measured polarization; and
  it stores the determined bit, the respective selected base and the time instant when said photon is received.

After transmission of the photons terminates, the device A sends to the device B, over the conventional link of the quantum channel, the bases used to polarize the transmitted photons, and the device B sends to the device A, again over the conventional link of the quantum channel, the bases used to measure the polarizations of the received photons. The devices A and B discard any bits for which the device B has used a base for measuring the photon's polarization that is different from the one used by the device A to polarize said photon. Each device thus obtains a respective raw key constituted by the non-discarded bits.

For the sake of description simplicity, up to now the BB84 protocol has been described assuming that the device A transmits single photons to the device B over the quantum channel. However, as is known, the BB84 protocol can also be implemented using pairs of so-called entangled photons, where the photons of each pair carry the same quantum information.

In particular, in the case of a BB84 protocol based on pairs of entangled photons, a quantum device coupled to the quantum channel that connects the devices A and B is used to transmit pairs of entangled photons over said quantum channel, specifically over the quantum link of the quantum channel, such that, for each transmitted pair, a first photon is received by the device A and a second photon is received by the device B.

In detail, in the case of a BB84 protocol based on pairs of entangled photons, for each photon received over the quantum channel, each of the devices A and B performs the following operations:

each device randomly selects a respective base;
each device measures the polarization of the received photon using the respective selected base;
each device determines the bit encoded by the measured polarization; and
each device stores the determined bit, the respective selected base and the time instant when said photon is received.

After transmission of the photons terminates, the devices A and B exchange the bases used to measure the polarizations of the received photons over the conventional link of the quantum channel and discard the bits for which they used different bases. Each device thus obtains a respective raw key constituted by the non-discarded bits.

Ideally, both in the case of a BB84 protocol based on single photons and in the case of a BB84 protocol based on pairs of entangled photons, the raw keys generated by devices A and B should coincide. Unfortunately, however, in real world the two raw keys do not coincide due to possible eavesdropping carried out by an unauthorized third party and due to the non-ideality of the quantum channel and the communication devices involved in QKD, or rather due to errors (QBER) inevitably made in generating the raw keys.

Therefore, both in the case of a BB84 protocol based on single photons and in the case of a BB84 protocol based on pairs of entangled photons, after having generated the raw keys, the devices A and B carry out two further steps that result in the generation of a single cryptographic key known only by said devices A and B. These further steps of the BB84 protocol are respectively known as information reconciliation and privacy amplification and were described for the first time by C. H. Bennett, F. Bessette, G. Brassard, L. Salvail and J. Smolin in *"Experimental Quantum Cryptography"*, Journal of Cryptology, vol. 5, n. 1, 1992, pp. 3-28.

In particular, in the information reconciliation step, the devices A and B correct errors in the two raw keys so as to generate an identical reconciled key for both the devices A and B.

In detail, in the information reconciliation step, the devices A and B exchange useful information over the conventional link of the quantum channel for correcting the errors in the raw keys, so as to minimize the information transmitted with regard to each raw key.

At the end of the information reconciliation step, the devices A and B obtain one the same reconciled key and are also able to recognise:

what information on the raw keys has been eavesdropped by an unauthorized third party during the generation of the raw keys: and what information on the reconciled key has been eavesdropped by an unauthorized third party during the information reconciliation step.

Finally, in the privacy amplification step, on the basis of the reconciled key and by means of a reciprocal authentication mechanism for the devices A and B, or rather for the respective users, the devices A and B generate one and the same secure key that can be used by said devices A and B, or rather by the respective users, to communicate with each other in a secure manner over a public channel.

In particular, in the privacy amplification step, by means of a reciprocal authentication mechanism for the devices A and B, or rather for the respective users, the devices A and B generate one and the same secure key that is shorter than the reconciled key so as to minimize the probability that an unauthorized third party could trace said secure key on the basis of the eavesdropped information.

In detail, each of devices A and B performs the following operations in the privacy amplification step:

each device determines a respective hash matrix on the basis of a respective current authentication key: and
each device compresses the reconciled key by means of the respective hash matrix, thereby obtaining a respective final bit string that is shorter than the reconciled key.

In greater detail, if both the devices A and B, or rather both the respective users, possess one and the same current authentication key, said devices A and B determine one and the same hash matrix on the basis of the same current authentication key, and therefore, when compressing the reconciled key using the same hash matrix, generate one and the same final bit string that comprises:

one and the same quantum key that can be used by said devices A and B, or rather by the respective users, to communicate with each other in a secure manner over a public channel; and
one and the same new authentication key to be used as the current authentication key in the privacy amplification step of a subsequent QKD.

Instead, if the devices A and B, or rather the respective users, do not have a same current authentication key, at the end of the privacy amplification step, said devices A and B generate two different final bit strings and therefore two different quantum keys and two different new authentication keys, which thus become unusable.

A first drawback of QKD is related to the fact that the two involved communication devices must be relatively close because the quantum link of the quantum channel that connects them can only be a few kilometers at most.

Furthermore, a second drawback is related to the fact that, if it is wished to exploit QKD to enable a plurality of communication devices to communicate securely, it is necessary that each possible pair of communication devices is connected by means of a respective quantum channel.

Consequently, since the cost associated with implementing a single quantum channel is rather high, the implementation of a respective quantum channel for every possible pair of communication devices becomes very expensive.

Lastly, the constraint of the existence of a quantum channel for every possible pair of nodes limits the physical size of a network fully connected with the maximum permitted distance for a quantum link.

PCT application WO 2007/123869 A2 describes cryptographic key management and user authentication systems and methods for quantum cryptography networks that enable users to communicate securely over a traditional communication channel.

In particular, WO 2007/123869 A2 describes a method that includes connecting a cryptographic key central authority QKCA to each user in a secure manner by means of quantum links that enable data to be encrypted and decrypted on the basis of quantum keys. According to the method described in WO 2007/123869 A2, when two users wish to communicate with each other in a secure manner, the cryptographic key central authority QKCA sends a random bit sequence to each user over the respective quantum link and then the two users use said random bit sequence as a key to encode and decode the data that they exchange over a traditional communication channel.

According to a specific embodiment of the invention described in WO 2007/123869 A2 (in particular, described on page 8 and illustrated in FIG. 4 of WO 2007/123869 A2), a First user A is connected by means of a first quantum channel QL-A to a first cryptographic key central authority QKCA-A and a second user B is connected by means of a second quantum channel QL-B to a second cryptographic key central authority QKCA-B that, in turn, is connected to the first cryptographic key central authority QKCA-A by means of a third quantum channel QL-AB. When the first user A wishes to communicate with the second user B over a traditional communications channel, said first user A submits a request for communication with said second user B over the first quantum channel QL-A to the first cryptographic key central authority QKCA-A, which routes said request over the third quantum channel QL-AB to the second cryptographic key central authority QKCA-B, which, in turn, routes said request over the second quantum channel QL-B to the second user B. If the second user B accepts the request, the second cryptographic key central authority QKCA-B generates a random bit sequence and sends said random bit sequence to the second user B over the second quantum channel QL-B and to the first cryptographic key central authority QKCA-A over the third quantum channel QL-AB. The first cryptographic key central authority QKCA-A then routes said random bit sequence to the first user A over the first quantum channel QL-A. In other words, the first cryptographic key central authority QKCA-A acts as a router between the first user A and the second cryptographic key central authority QKCA-B that generates the random bit sequence to be used to render communications over the traditional communication channel between users A and B secure.

The aforesaid specific embodiment of the invention described in WO 2007/123869 A2 has some intrinsic security problems, as the first cryptographic key central authority QKCA-A knows the random bit sequence to be uses to render communications between users A and B secure. Therefore, if the first cryptographic key central authority QKCA-A were in bad faith, it could distribute said random bit sequence also to other unauthorized users, that would consequently be able to decode the data exchanged over the traditional communication channel between users A and B without them becoming aware of it.

SUMMARY OF THE INVENTION

The object of the present invention is therefore that of providing a cryptographic key distribution system based on quantum key distribution that is able to mitigate the previously described drawbacks.

The above-stated object is achieved by the present invention in that it relates to a cryptographic key distribution system, according to that defined in the appended claims.

In particular, a first aspect of the present invention relates to a cryptographic key distribution system comprising a server node and one or more client node(s), each client node being connected to the server node by means of a respective quantum channel.

According to said first aspect of the present invention, the server node and each client node are configured to cooperatively generate link quantum keys associated with system subscribers by implementing quantum key distributions on the respective quantum channel, and each client node is configured to supply a specific system subscriber with a link quantum key cooperatively generated with the server node and associated with said specific subscriber.

Moreover, according to said first aspect of the present invention, the server node is further configured to:
  encrypt a traffic cryptographic key associated with a first system subscriber and a second system subscriber on the basis of a first link quantum key associated with the first subscriber;
  send the traffic cryptographic key encrypted on the basis of the first link quantum key to the first subscriber by means of one or more public communication channel(s);
  encrypt the traffic cryptographic key associated with the first and second system subscribers on the basis of a second link quantum key associated with the second subscriber; and
  send the traffic cryptographic key encrypted on the basis of the second link quantum key to the second subscriber by means of one or more public communication channel(s).

Furthermore, a second aspect of the present invention relates to a cryptographic key distribution system that comprises:
  a server node;
  at least a first client node connected to the server node by means of a first quantum channel;
  a repeater network connected to the server node by means of a second quantum channel; and
  at least a second client node connected to the repeater network by means of a third quantum channel.

According to said second aspect of the present invention, the server node and the first client node are configured to cooperatively generate a first link quantum key associated with a first system subscriber by implementing a quantum key distribution on the first quantum channel; the first client node is configured to provide the first subscriber with the first link quantum key; the repeater network and the second client node are configured to cooperatively generate a transfer quantum key associated with a second system subscriber by implementing a quantum key distribution on the third quantum channel; the second client node is configured to provide the second subscriber with the transfer quantum key; and the server node and the repeater network are configured to cooperatively generate a second link quantum key associated with the second subscriber by implementing a quantum key distribution on the second quantum channel.

Moreover, according to said second aspect of the present invention, the repeater network is further configured to:
  encrypt the second link quantum key on the basis of the transfer quantum key: and
  send the encrypted second link quantum key to the second subscriber by means of one or more public communication channel(s).

Finally, according to said second aspect of the present invention, the server node is further configured to:
  encrypt a traffic cryptographic key associated with the first and second system subscribers on the basis of the first link quantum key and of a first service authentication key associated with the first subscriber;

send the traffic cryptographic key encrypted on the basis of the first link quantum key and of the first service authentication key to the first subscriber by means of one or more public communication channel(s);

encrypt the traffic cryptographic key associated with the first and second system subscribers on the basis of the second link quantum key and of a second service authentication key associated with the second subscriber; and send the traffic cryptographic key encrypted on the basis of the second link quantum key and of the second service authentication key to the second subscriber by means of one or more public communication channel(s).

BRIEF DESCRIPTION OF DRAWINGS

For a better understanding of the present invention, some preferred embodiments, provided by way of non-limitative example, will now be illustrated with reference to the attached drawings (not to scale), where.

DETAILED DESCRIPTION OF THE INVENTION

The following description is provided to enable an expert in the field to embody and use the invention. Various modifications to the described embodiments will be immediately obvious to experts in the field, and the generic principles described herein can be applied to other embodiments and applications without leaving the scope of protection of the present invention.

In consequence, the present invention should not be considered as limited to just the embodiments described and illustrated herein, but be conceded the broadest scope of protection consistent with the principles and characteristics described herein and defined in the appended claims.

The present invention relates to a cryptographic key distribution system based on Quantum Key Distribution (QKD).

According to the present invention, in order to implement a QKD, both the BB84 protocol based on single photons and the BB84 protocol based on pairs of entangled photons can be conveniently used.

A cryptographic key distribution system according to a first aspect of the present invention comprises:
at least one server node; and
one or more client node(s).

According to said first aspect of the present invention, each client node is connected to the server node by means of a corresponding quantum channel that comprises:
a respective quantum link, for example, in optical fibre or in free space; and
a respective public link, i.e., an eavesdroppable link, such as a connection via the Internet.

Furthermore, always according to said first aspect of the present invention, the server node is configured to implement with each client node respective BB84-protocol-based QKDs on the corresponding quantum channel.

Figure 1:
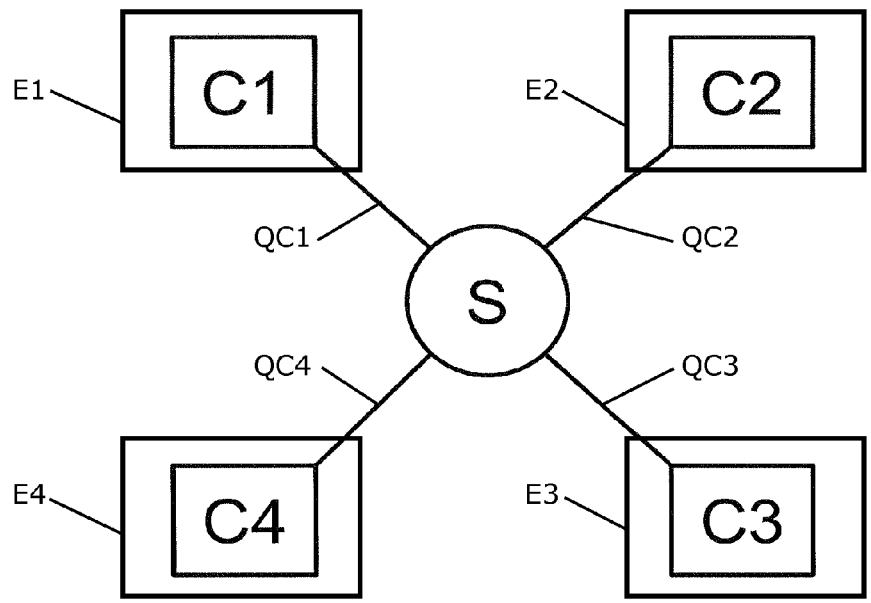
FIG. 1 schematically shows a cryptographic key distribution system according to a first aspect of the present invention.

In order to describe in detail the first aspect of the present invention, FIG. 1 schematically shows an example of a cryptographic key distribution system according to said first aspect of the present invention.

In particular, the cryptographic key distribution system shown in FIG. 1 comprises:
a server node S; and
four electronic communication devices E1, E2, E3, E4, each including a client node respectively indicated as C1, C2, C3 and C4, each of which is connected to the server node S by means of a corresponding, quantum channel QC1,QC2, QC3,QC4 represented in FIG. 1 by a solid line segment.

In use, each of the client nodes C1, C2, C3 and C4 can be used by one or more subscribers to the cryptographic key distribution system.

In particular, a subscriber to the cryptographic key distribution system can use one of the client nodes C1, C2, C3 and C4 to receive one or more respective link quantum keys. In fact, the server node S and each of the client nodes C1, C2, C3 and C4 are configured to cooperatively generate respective link quantum keys by implementing respective BB84-protocol-based QKDs on the corresponding quantum channel.

In detail, if a subscriber to the cryptographic key distribution system uses one of the client nodes C1, C2, C3 and C4 to receive a respective link quantum key, the server node S and the used client node implement a BB84-protocol-based QKD on the corresponding quantum channel in order to generate a link quantum key $k_L$ associated with said subscriber.

In greater detail, when a subscriber to the cryptographic key distribution system uses one of the client nodes C1, C2, C3 and C4 to receive a respective link quantum key, the following operations are carried out:

the used client node receives from the subscriber a current QKD authentication key $k_{AUT\text{-}QKD}$ of M bits of said subscriber towards the server node S;

the used client node and the server node S, which stores said current QKD authentication key $k_{AUT\text{-}QKD}$ of the subscriber towards said server node S, implement a BB84-protocol-based QKD on the corresponding quantum channel by using said current QKD authentication key $k_{AUT\text{-}QKD}$ of the subscriber towards the server node S in the privacy amplification step; in this way, the used client node and the server node S generate a string of L bits that comprises a link quantum key $k_L$ of N bits associated with the subscriber and a new QKD authentication key $k_{AUT\text{-}QKD}^{NEW}$ of M bits of the subscriber towards the server node S (where L=N+M):

the server node S stores the link quantum key $k_L$ associated with said subscriber and the new QKD authentication key $k_{AUT\text{-}QKD}^{NEW}$ of said subscriber towards said server node S; and the used client node provides the subscriber with the link quantum key $k_L$ associated with said subscriber and the new QKD authentication key $k_{AUT\text{-}QKD}^{NEW}$ of said subscriber towards the server node S.

When the subscriber uses again one of the client nodes C1, C2, C3 and C4 to receive a new link quantum key, the used client node and the server node S will use the new QKD authentication key $k_{AUT\text{-}QKD}^{NEW}$ of said subscriber towards the server node S in the privacy amplification step of the new QKD implemented to generate the new link quantum key.

Conveniently, the initial QKD authentication key towards the server node S can be provided to each subscriber when signing the subscription to the cryptographic key distribution system.

A subscriber to the cryptographic key distribution system according to the first aspect of the present invention who uses a client node to receive a respective link quantum key $k_L$ can conveniently provide said client node with the respective current authentication key QKD $k_{AUT-QKD}$ towards the server node S in various ways, in particular:
- by means of a user interface of said client node; or
- by locally connecting to said client node, for example by means of a USB connection, a respective portable electronic device that stores said respective current authentication key QKD $k_{AUT-QKD}$ towards the server node S; in this case, the client node acquires/receives the current authentication key QKD $k_{AUT-QKD}$ from the locally connected portable electronic device.

In the same way, a client node can conveniently provide a subscriber with the respective link quantum key $k_L$ and the new authentication key QKD $k_{AUT-QKD}^{NEW}$ of said subscriber towards the server node S in various ways, in particular:
- by means of a user interface of said client node; or
- by storing said keys on a portable electronic device of said subscriber locally connected to said client node, for example by means of a USB connection.

The portable electronic device locally connected to the client node can conveniently be a portable data storage device, such as a USB flash drive or an external USB hard disk drive, or a portable computer, such as a laptop or a tablet, or a smartphone.

At this point, in order to continue to describe in detail the operation of the cryptographic key distribution system shown in FIG. 1, it is assumed that:
- P (where P>1) subscribers to said cryptographic key distribution system have used at least one of the client nodes C1, C2, C3 and C4 to receive, each, a respective link quantum key;
- the server node S stores the link quantum keys of said P subscribers; and
- said P subscribers, as they intend to communicate with each other in a secure manner, are remotely connected, each one using a respective electronic communication device (such as a desktop computer, a laptop, a tablet, a smartphone or even one of the client nodes C1, C2, C3 and C4), to the server node S by means of one or more respective public channel(s), for example via the Internet, to request a common cryptographic key to be used to create a secure communication.

Conveniently, messages, which are sent by the P subscribers to the server node S and which relate to the request for establishing a secure communication among said P subscribers and, thence, to the request of a corresponding cryptographic key common to said P subscribers, are encrypted in order to prevent any unauthorized third party from being able to fraudulently intercept and decrypt said messages and then to take the place of one of said authorized P subscribers or to join said authorized subscribers.

In order to enable a secure communication among said P subscribers, the server node S performs the following operations:
- generates a traffic cryptographic key for said P subscribers;
- for each of said P subscribers, encrypts the traffic cryptographic key on the basis of the respective link quantum key thereby obtaining a respective encrypted message; and
- send the respective encrypted message to each of said P subscribers over the respective public channel(s).

Each of said P subscribers, upon receiving the respective encrypted message from the server node S, decrypts it using the respective link quantum key, thus obtaining the traffic cryptographic key.

Preferably, the server node S is configured to randomly generate the traffic cryptographic keys.

Even more preferably, the server node S is configured to operate as a Quantum Random Number Generator (QRNG). Therefore, in use, the server node S generates the traffic cryptographic keys by operating as a QRNG.

In an alternative embodiment, the server node S does not generate the traffic cryptographic keys, but is configured to receive them from a key generator, for example a QRNG, separate from said server node S. In particular, the server node S can be conveniently connected to the key generator by means of an intrinsically secure channel, that is one such as to guarantee, or not compromise, the security of the connection between the server node S and the key generator, and, in consequence, the server node S can conveniently receive the traffic cryptographic keys in an absolutely secure manner over said intrinsically secure channel. Alternatively, an administrator of the server node S could conveniently carry out the following procedure in order to provide the traffic cryptographic keys to the server node S:
- causing the key generator to generate the traffic cryptographic keys;
- locally connecting, for example by means of a USB connection, a portable electronic device, such as a USB flash drive, an external USB hard disk drive, a laptop, a tablet, or a smartphone, to said key generator;
- storing the traffic cryptographic keys generated by the key generator on said portable electronic device locally connected to the key generator; and
- going to the server node S and locally connecting, for example by means of a USB connection, said portable electronic device on which the traffic cryptographic keys are stored to said server node S: in this way the server node S acquires/receives the traffic cryptographic keys from the locally connected portable electronic device.

Going into greater detail regarding the operation of the cryptographic key distribution system according to the first aspect of the present invention, the link quantum keys are used by the server node S to encrypt the traffic cryptographic key according to the so-called "One-Time Pad" (OTP) methodology.

For example, if a first subscriber associated with a first link quantum key $k_{L1}$ of N bits and a second subscriber associated with a second link quantum key $k_{L2}$ of N bits connect to the server node S to request a common cryptographic key to be used to communicate with each other in a secure manner (as previously said, by sending to server node S respective encrypted messages), the server node S performs the following operations:
- generates (or, in the above-stated alternative embodiment, receives from the key generator) and stores a traffic cryptographic key $k_T$ of N bits;
- performs an OTP encryption of the traffic cryptographic key $k_T$ using the first link quantum key $k_{L1}$ as the encryption key thereby obtaining a first encrypted message $k_T \oplus k_{L1}$ of N bits, where the symbol $\oplus$ represents the exclusive OR logical operation, i.e., the XOR logical operation:
- sends the first encrypted message $k_T \oplus k_{L1}$ to the first subscriber:
- performs an OTP encryption of the traffic cryptographic key $k_T$ using the second link quantum key $k_{L2}$ as the encryption key thereby obtaining a second encrypted message $k_T \oplus k_{L2}$ of N bit: and
- sends the second encrypted message $k_T \oplus k_{L2}$ to the second subscriber.

The first subscriber decrypts the first encrypted message $k_T \oplus k_{L1}$ received from the server node S using the first link quantum key $k_{L1}$, and thus obtains the traffic cryptographic key $k_T$.

In the same way, the second subscriber decrypts the second encrypted message $k_T \oplus k_{L2}$ received from the server node S using the second link quantum key $k_{L2}$, and thus obtains the traffic cryptographic key $k_T$.

From the foregoing description, it can be immediately appreciated how, thanks to the OTP encryption, the distribution of the traffic cryptographic key $k_T$ to the two subscribers entails practically no risk of said traffic cryptographic key $k_T$ being eavesdropped by an unauthorized third party.

In particular, the use of the OTP encryption for the transfer of the traffic cryptographic key $k_T$ guarantees the inviolability of the traffic cryptographic key $k_T$ itself, as demonstrated by Claude Shannon in "*Communication Theory of Secrecy Systems*", Bell System Technical Journal, vol. 28(4), pages 656-715, 1949. In fact if an unauthorized third party abusively eavesdrops the first encrypted message $k_T \oplus k_{L1}$ and the second encrypted message $k_T \oplus k_{L2}$, at most said unauthorized third party would obtain:

$$k_T \oplus k_{L1} \oplus k_T k_{L2} = k_{L1} \oplus k_T \oplus k_T k_{L2} = k_{L1} \oplus k_{L2}$$

Therefore, as all the keys are random, the unauthorized third party does not obtain information on the traffic cryptographic key $k_T$ and the link quantum keys $k_{L1}$ and $k_{L2}$.

In consequence, the distribution of one and the same traffic cryptographic key to P subscribers (where P>1) enables said P subscribers to communicate with each other in a secure manner over one or more public channel(s), for example via the Internet.

Conveniently, the traffic cryptographic key can be used by said P subscribers as an encryption key, can be used by said P subscribers as an aid for encryption algorithms, can be used by said P subscribers directly for an OTP encryption, can be stored on electronic devices of said P subscribers (for example on portable data storage devices, such as USB flash drives or external USB hard disk drives, or on desktop computers, or on portable computers, such as laptops or tablets, or on smartphone, etc.) for subsequent use by said P subscribers to communicate with each other in a secure manner, etc.

After a link quantum key has been used for OTP encryption of a traffic cryptographic key, this link quantum key is discarded and a new link quantum key must be used for the distribution of a new traffic cryptographic key.

Therefore, with the cryptographic key distribution system according to the first aspect of the present invention, the three following distribution strategies for link quantum keys and traffic cryptographic keys can be adopted:

1) every time P (where P>1) subscribers to the cryptographic key distribution system need to communicate with each other in a secure manner, said P subscribers use one or more client node(s) to obtain, each, a respective link quantum key that they then use to obtain one and the same traffic cryptographic key from the server node S;

2) a subscriber to the cryptographic key distribution system uses a client node to obtain a plurality of link quantum keys that he/she stores on a respective electronic device (for example on portable data storage devices, such as USB flash drives or external USB hard disk drives, or on desktop computers, or on portable computers, such as laptops or tablets, or on smartphones, etc.), and then uses them one at a time when he/she needs the obtain traffic cryptographic keys from the server node S; by using the stored link quantum keys, said subscriber can obtain the traffic cryptographic keys by means of a client node or by means of any electronic communication device able to communicate with the server node S over a public channel; once said subscriber runs out of stored link quantum keys, he/she must use a client node again to obtain further link quantum keys;

3) P (where P>1) subscribers to the cryptographic key distribution system use said cryptographic key distribution system to obtain a plurality of traffic cryptographic keys that they store on respective electronic devices (for example on portable data storage devices, such as USB flash drives or external USB hard disk drives, or on desktop computers, or on portable computers, such as laptops or tablets, or on smartphones, etc.), and then use them when they need to communicate with each other in a secure manner.

The cryptographic key distribution system according to the first aspect of the present invention is a hierarchical system in which the server node S is in possession of all the traffic cryptographic keys, all the link quantum keys and all the QKD authentication keys, while each subscriber only possesses the respective link quantum keys, the traffic cryptographic keys for which he/she is authorized and the respective current QKD authentication key towards the server node S.

In particular, the server node S works as a key-manager, or rather it:

stores/updates the generated traffic cryptographic keys, the distributed traffic cryptographic keys, the generated link quantum keys, the used link quantum keys, the generated QKD authentication keys, and the used QKD authentication keys in a database, where it also stores time data on when the keys were generated and distributed/used;

responds to global and/or special requests for cryptographic keys; and monitors the quantum network, or rather the network formed by the quantum channels, in real time so as to set, always in real time, the optimal parameters necessary for quantum communication.

The cryptographic key distribution system according to the first aspect of the present invention can conveniently comprise a backup server node configured to substitute the main server node S should the latter be unable to operate, for example, in the event of a simple failure of the main server node S, or in the case of disaster recovery.

In particular, the backup server node can be conveniently configured to periodically synchronize itself with the main server node S such that all of the traffic cryptographic keys, the link quantum keys and the QKD authentication keys stored by said main server node S are stored/updated in a respective database, so as to be always aligned with the main server node S with regard to the keys generated and distributed/used.

In order to increase the level of security guaranteed by the cryptographic key distribution system, according to a preferred embodiment of the first aspect of the present invention, in addition to the link quantum keys, service authentication keys of the subscribers towards the server node S are also used to protect the distribution of the traffic cryptographic keys to the subscribers.

In particular, according to said preferred embodiment of the first aspect of the present invention, a first subscriber and a second subscriber, after having respectively received the first link quantum key $k_{L1}$ and the second link quantum key $k_{L2}$, connect to the server node S to request a common cryptographic key to be used for communicating with each other in a secure manner (as previously said, by sending to server node S respective encrypted messages), and the server node S, which stores a current service authentication key $k_{AUT-S-1}$ of D bits of the first subscriber towards said server node S and a current service authentication key $k_{AUT-S-2}$ of D bits of the second subscriber towards said server node S, performs the following operations:

- generates (or, in the aforesaid alternative embodiment, receives from the key generator) and stores a traffic cryptographic key $k_T$ of N' bits;
- generates (or, in the aforesaid alternative embodiment, receives from the key generator) and stores a new service authentication key $k_{AUT-S-1}^{NEW}$ of D bits of the first subscriber towards said server node S;
- performs an OTP encryption of the traffic cryptographic key $k_T$ and the new service authentication key $k_{AUT-S-1}^{NEW}$ of the first subscriber towards said server node S by using the first link quantum key $k_{L1}$ as encryption key and, in this way, obtains a first encrypted message $(k_T + k_{AUT-S-1}^{NEW}) \oplus k_{L1}$ or N bits (where N=N'+D);
- performs a non-OTP encryption of the first encrypted message $(k_T + k_{AUT-S-1}^{NEW}) \oplus k_{L1}$, for example based on a symmetric-key encryption algorithm, by using the current service authentication key $k_{AUT-S-1}$ of the first subscriber towards said server node S as encryption key and, in this way, obtains a second encrypted message;
- sends the second encrypted message to the first subscriber;
- generates (or, in the aforesaid alternative embodiment, receives from the key generator) and stores a new service authentication key $k_{AUT-S-2}^{NEW}$ of D bits of the second subscriber towards said server node S;
- performs an OTP encryption of the traffic cryptographic key $k_T$ and the new service authentication key $k_{AUT-S-2}^{NEW}$ of the second subscriber towards said server node S by using the second link quantum key $k_{L2}$ as encryption key and, in this way, obtains a third encrypted message $(k_T + k_{AUT-S-2}^{NEW}) \oplus k_{L2}$ of N bits;
- performs a non-OTP encryption of the third encrypted message $(k_T + k_{AUT S 2}^{NEW}) \oplus k_{L2}$, for example based on a symmetric-key encryption algorithm, by using the current service authentication key $k_{AUT-S-2}$ of the second subscriber towards said server node S as encryption key and, in this way, obtains a fourth encrypted message; and
- sends the fourth encrypted message to the second subscriber.

The first subscriber decrypts the second encrypted message received from the server node S by using, firstly, the current service authentication key $k_{AUT-S-1}$ of said first subscriber towards said server node S and, then, the first link quantum key $k_{L1}$, thereby obtaining the traffic cryptographic key k and the new service authentication key $k_{AUT-S-1}^{NEW}$ of said first subscriber towards said server node S.

In the same way, the second subscriber decrypts the fourth encrypted message received from the server node S by using, firstly, the current service authentication key $k_{AUT S 2}$ of said second subscriber towards said server node S and, then, the second link quantum key $k_{L2}$, thereby obtaining the traffic cryptographic key $k_T$ and the new service authentication key $k_{AUT-S-2}^{NEW}$ of said second subscriber towards said server node S.

The new service authentication keys of the first and second subscribers towards the server node S will then be used for the distribution of new traffic keys from the server node S to the first and second subscribers.

Conveniently, the initial service authentication keys towards the server node S can be supplied to the subscribers when the latter subscribe to the cryptographic key distribution system.

According to the first aspect of the present invention, when a subscriber wishes to communicate with the server node S, for example to request a traffic cryptographic key in order to be able to communicate securely with another subscriber, he/she can conveniently perform the entire procedure previously described in relation to the generation of a respective link quantum key by using a client node and in relation to the distribution (with or without the use of the respective service authentication key towards the server node S) of a traffic cryptographic key, so as to obtain a further traffic cryptographic key that the subscriber can conveniently use to communicate in a secure manner with the server node S.

The cryptographic key distribution system according to the first aspect of the present invention has, with regard to the quantum network, a star architecture that can be conveniently expanded both to guarantee the generation and distribution of cryptographic keys over distances greater than metropolitan ones (approximately 90 Km) and to guarantee system redundancy from a net-centric point of view.

In particular, according to a second aspect of the present invention, the architecture of the quantum network of the cryptographic key distribution system can be conveniently expanded by using one or more repeater node(s) that is/are configured to operate both as server node(s) and as client node(s).

Figure 2:
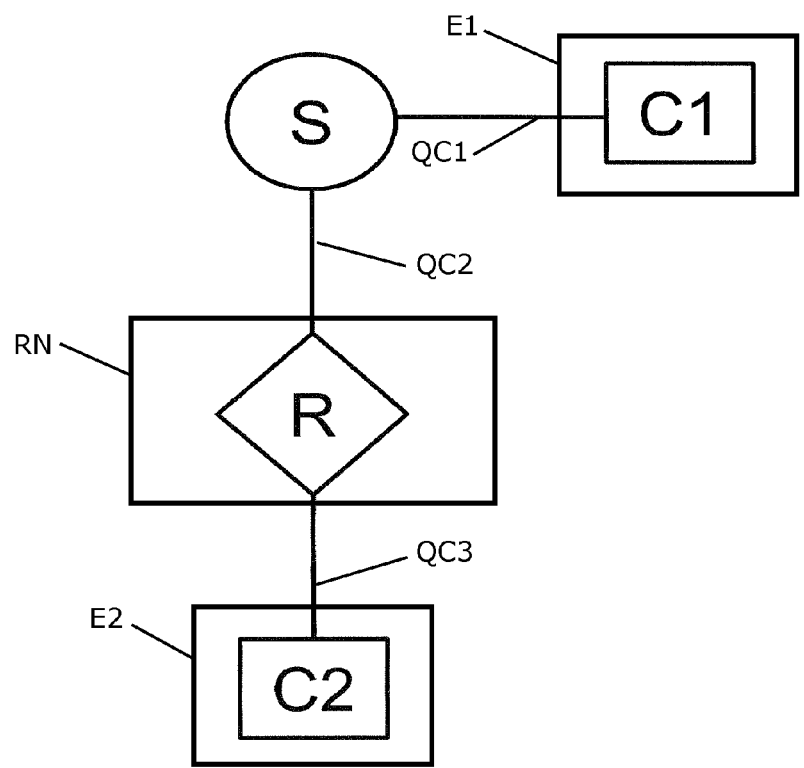
FIG. 2 schematically shows a cryptographic key distribution system according to a second aspect of the present invention.

In this regard, in order the describe the second aspect of the present invention, FIG. 2 shows an example of a cryptographic key distribution system according to said second aspect of the present invention.

In particular, the cryptographic key distribution system shown in FIG. 2 comprises:

- a server node S;
- a first electronic communication device E1 including a first client node C1 connected to the server node S by means of a first quantum channel QC1 represented in FIG. 2 by a solid line segment;
- a repeater network RN including a repeater node R connected to the server node S by means of a second quantum channel QC2 represented in FIG. 2 by a solid line segment; and
- a second electronic communication device E2 including a second client node C2 that is connected to the repeater node R by means of a third quantum channel QC3 represented in FIG. 2 by a solid line segment.

In use, the client nodes C1 and C2 can be used, each, by one or more subscriber(s) of the cryptographic key distribution system to receive one or more respective link quantum key(s).

In particular, if, for example, a first subscriber uses the first client node C1 to receive a respective link quantum key, the following operations are carried out:

- the first client node C1 receives from the first subscriber a current QKD authentication key $k_{AUT\ QKD\ 1}$ of M bits of said first subscriber towards the server node S;
- the first client node C1 and the server node S which stores said current QKD authentication key $k_{AUT\ QKD\ 1}$ of the first subscriber towards said server node S, implement a BB84-protocol-based QKD on the first quantum channel by using said current QKD authentication key $k_{AUT-QKD-1}$ of the first subscriber towards said server node S in the privacy amplification step; in this way, the first client node C1 and the server node S generate a string of L bits that comprises a first link quantum key $k_{L1}$ of N bits associated with said first subscriber and a new QKD authentication key $k_{AUT-QKD\ 1}^{NEW}$ of M bits of said first subscriber towards the server node S (where L=N+M);

the server node S stores the first link quantum key $k_{L1}$ associated with said first subscriber and the new QKD authentication key $k_{AUT\text{-}QKD\text{-}1}^{NEW}$ of said first subscriber towards said server node S; and the first client node C1 provides the first subscriber with the first link quantum key $k_{L1}$ associated with said first subscriber and the new QKD authentication key $k_{AUT\text{-}QKD\text{-}1}^{NEW}$ of said first subscriber towards the server node S.

When the first subscriber uses again a client node to receive a new link quantum key, said client node and the server node S will use the new QKD authentication key $k_{AUT\text{-}QKD\text{-}1}^{NEW}$ of said first subscriber towards the server node S in the privacy amplification step of the new QKD implemented to generate the new link quantum key.

Conveniently, the initial QKD authentication key towards the server node S can be provided to the first subscriber when the latter subscribes to the cryptographic key distribution system.

Furthermore, if a second subscriber uses the second client node C2 to receive a respective link quantum key, the following operations are carried out:

the server node S and the repeater node R, which stores a current QKD authentication key $k_{AUT\ QKD\ R}$ of M bits of said repeater node R towards said server node S, implement a BB84-protocol-based QKD on the second quantum channel by using the current QKD authentication key $k_{AUT\ QKD\ R}$ of said repeater node R towards said server node S in the privacy amplification step: in this way, the server node S and the repeater node R generate a string of L bits that comprises a second link quantum key $k_{L2}$ of N bits associated with said second subscriber and a new QKD authentication key $k_{AUT\text{-}QKD\ R}^{NEW}$ of M bits of said repeater node R towards said server node S (where L=N+M);

the server node S stores said second link quantum key $k_{L2}$ associated with said second subscriber and the new QKD authentication key $k_{AUT\text{-}QKD\text{-}R}^{NEW}$ of said repeater node R towards said server node S;

the repeater node R stores the new QKD authentication key $k_{AUT\text{-}QKD\text{-}R}^{NEW}$ of said repeater node R towards said server node S;

the second client node C2 (which has received from the second subscriber a current QKD authentication key $k_{AUT\text{-}QKD\text{-}2}$ of M bits of said second subscriber towards the repeater node R) and the repeater node R (which stores said current QKD authentication key $k_{AUT\text{-}QKD\ 2}$ of said second subscriber towards said repeater node R) implement a BB84-protocol-based QKD on the third quantum channel by using said current QKD authentication key $k_{AUT\ QKD\ 2}$ of said second subscriber towards said repeater node R in the privacy amplification step and in this way, generate a string of L bits that comprises a transfer quantum key $k_{R\ 2}$ of N bits and a new QKD authentication key $k_{AUT\text{-}QKD\text{-}1}^{NEW}$ of M bits of said second subscriber towards the repeater node R;

the second client node C2 provides the second subscriber with the transfer quantum key $k_{R\text{-}2}$ and the new QKD authentication key $k_{AUT\text{-}QKD\text{-}1}^{NEW}$ of said second subscriber towards the repeater node R;

the repeater node R
stores the new QKD authentication key $k_{AUT\ QKD\ 2}^{NEW}$ of said second subscriber towards said repeater node R,
performs an OTP encryption of the second link quantum key $k_{L2}$ by using the transfer quantum key $k_{R\text{-}2}$ as encryption key, thereby obtaining an encrypted message $k_{L2}\oplus k_{R\ 2}$ of N bits, and sends said encrypted message $k_{L2}\oplus k_{R\text{-}2}$ over a public channel to the second subscriber, who conveniently uses a respective electronic communication device (such as a desktop computer, a laptop, a tablet, or even a client node): and the second subscriber decrypts the encrypted message $k_{L2}\oplus k_{R\text{-}2}$ received from the repeater node R using the transfer quantum key $k_{R\text{-}2}$ thereby obtaining the second link quantum key $k_{L2}$.

When the second subscriber uses a client node connected to the repeater node R to receive a new link quantum key, said client node and the repeater node R will use the new QKD authentication key $k_{AUT\text{-}QKD\text{-}2}^{NEW}$ of said second subscriber towards the repeater node R in the privacy amplification step of the new QKD implemented to generate the new transfer quantum key, and the repeater node R and the server node S will use the new QKD authentication key $k_{AUT\text{-}QKD\ R}^{NEW}$ of said repeater node R towards said server node S in the privacy amplification step of the new QKD implemented to generate the new link quantum key for the second subscriber.

Conveniently, the initial QKD authentication key towards the server node S can be supplied to the repeater node R at the time of installation, whilst it can be supplied to the second subscriber when the latter subscribes to the cryptographic key distribution system.

A subscriber to the cryptographic key distribution system according to the second aspect of the present invention who uses a client node (connected directly to the server node S or to the repeater node R) to receive a respective link/transfer quantum key $k_L/k_R$, can conveniently provide said client node with the respective current QKD authentication key $k_{AUT\text{-}QCD}$ towards the server/repeater node S/R in various ways, in particular:

by means of a user interface of said client node; or by locally connecting, for example by means of a USB connection, a respective portable electronic device that stores said respective current authentication key QKD $k_{AUT\text{-}QKD}$ towards the server/repeater node S/R; in this case, the client node acquires/receives the current authentication key QKD $k_{AUT\ QKD}$ from the locally connected portable electronic device.

In the same way, a client node can conveniently provide a subscriber with the respective link/transfer quantum key $k_L/k_R$ and the new QKD authentication key $k_{AUT\ QKD}^{NEW}$ of said subscriber towards the server/repeater node S/R in various ways, in particular:

by means of a user interface of said client node; or by storing said keys on a portable electronic device of said subscriber locally connected to said client node, for example by means of a USB connection.

The portable electronic device locally connected to the client node can conveniently be a portable data storage device, such as a USB flash drive or an external USB hard disk drive, or a portable computer, such as a laptop or a tablet, or a smartphone.

At this point, if the first subscriber and the second subscriber, after having respectively received the first link quantum key $k_{L1}$ and the second link quantum key $k_{L2}$, connect to the server node S, both using a respective electronic communication device (for example a desktop computer, a laptop, a tablet, or even a client node), to request a common cryptographic key to be used to communicate with each other in a secure manner, the server node S, which stores a current service authentication key $k_{AUT\ S\ 1}$ of D bits of the first subscriber towards said server node S and a current service authentication key $k_{AUT\,S\,2}$ of D bits of the second subscriber towards said server node S, performs the following operations.

generates and stores a traffic cryptographic key $k_T$ of N' bits;

generates and stores a new service authentication key $k_{AUT\,S\,1}^{NEW}$ of D bits of the first subscriber towards said server node S;

performs an OTP encryption of the traffic cryptographic key $k_T$ and the new service authentication key $k_{AUT\text{-}S\text{-}1}^{NEW}$ of the first subscriber towards said server node S by using the first link quantum key $k_{L1}$ as encryption key and, in this way, obtains a first encrypted message $(k_T + k_{AUT\text{-}S\text{-}1}^{NEW}) \oplus k_{L1}$ of N bus (where N−N'+D);

performs a non-OTP encryption of the first encrypted message $(k_T + k_{AUT\text{-}S\,1}^{NEW}) \oplus k_{L1}$, for example based on a symmetric-key encryption algorithm, by using the current service authentication key $k_{AUT\text{-}S\text{-}1}$ of the first subscriber towards said server node S as encryption key and, in this way, obtains a second encrypted message;

sends the second encrypted message to the first subscriber;

generates and stores a new service authentication key $k_{AUT\text{-}S\text{-}1}^{NEW}$ of D bits of the second subscriber towards said server node S;

performs an OTP encryption of the traffic cryptographic key $k_T$ and the new service authentication key $k_{AUT\text{-}S\text{-}2}^{NEW}$ of the second subscriber towards said server node S by using the second link quantum key $k_{L2}$ as encryption key and, in this way, obtains a third encrypted message $(k_T + k_{AUT\text{-}S\text{-}2}^{NEW}) \oplus k_{L2}$ of N bits;

performs a non-OTP encryption of the third encrypted message $(k_T + k_{AUT\text{-}S\text{-}2}^{NEW}) \oplus k_{L2}$, for example based on a symmetric-key encryption algorithm, by using the current service authentication key $k_{AUT\,S\,2}$ of the second subscriber towards said server node S as encryption key and, in this way, obtains a fourth encrypted message; and sends the fourth encrypted message to the second subscriber.

The first subscriber decrypts the second encrypted message received from the server node S using, firstly, the current service authentication key $k_{AUT\text{-}S\text{-}1}$ of said first subscriber towards said server node S and, then, the first link quantum key $k_{L1}$, thereby obtaining the traffic cryptographic key $k_T$ and the new service authentication key $k_{AUT\text{-}S\text{-}1}^{NEW}$ of said first subscriber towards said server node S.

In the same way, the second subscriber decrypts the fourth encrypted message received from the server node S using, firstly, the current service authentication key $k_{AUT\text{-}S\text{-}2}$ of said second subscriber towards said server node S and, then, the second link quantum key $k_{L2}$, thereby obtaining the traffic cryptographic key $k_T$ and the new service authentication key $k_{AUT\text{-}S\text{-}2}^{NEW}$ of said second subscriber towards said server node S.

The new service authentication keys of the first and second subscribers towards the server node S will then be used for the distribution of new traffic cryptographic keys from the server node S to the first and second subscribers.

Conveniently, the initial service authentication keys towards the server node S can be supplied to the first subscriber and the second subscriber when they subscribe to the cryptographic key distribution system.

As already described with respect to the first aspect of the present invention, the messages, which are sent by the first and second subscribers to the server node S and which relate to the request for establishing a secure communication among said subscribers and, thence, to the request of a corresponding cryptographic key common to said subscribers, are conveniently encrypted in order to prevent any unauthorized third party from being able to fraudulently intercept and decrypt said messages and then to take the place of one of said authorized subscribers or to join said authorized subscribers.

Preferably, the server node S is configured to randomly generate the traffic cryptographic keys and the new service authentication keys of the subscribers towards said server node S.

Still more preferably, the server node S is configured to operate as a QRNG. Therefore, in use, the server node S generates the traffic cryptographic keys and the new service authentication keys of the subscribers towards said server node S by operating as a QRNG.

In an alternative embodiment, the server node S does not generate the traffic cryptographic keys and the new service authentication keys of the subscribers towards said server node S, but is configured to receive them from a key generator, for example a QRNG, separate from said server node S. In particular, the server node S can be conveniently connected to the key generator by means of an intrinsically secure channel, that is one such as to guarantee, or not compromise, the security of the connection between the server node S and the key generator, and, in consequence, the server node S can conveniently receive the traffic cryptographic keys and the new service authentication keys of the subscribers towards said server node S in an absolutely secure manner over said intrinsically secure channel. Alternatively, the traffic cryptographic keys and the new service authentication keys of the subscribers towards the server node S can be conveniently supplied to said server node S by an administrator of said server node S who carries out the procedure previously described in relation to the first aspect of the present invention.

From the foregoing description, it can be immediately appreciated how, thanks to the double encryption, the distribution of the traffic cryptographic key $k_T$ to the two subscribers, entails practically no risk of said traffic cryptographic key $k_T$ being eavesdropped by an unauthorized third party.

In particular, thanks to the use of non-OTP encryption based on the current service authentication key $k_{AUT\text{-}S\text{-}2}$ of said second subscriber towards said server node S in the distribution of the traffic cryptographic key $k_T$ from the server node S to the second subscriber, not even the repeater node R, which actually knows the second link quantum key $k_{L2}$, is able to trace the traffic cryptographic key $k_T$. Therefore, the cryptographic key distribution system according to the second aspect of the present invention resolves the security problems that afflict the invention described in WO 2007/123869 A2.

In order to connect further client nodes positioned at distances far away from the server node S, the architecture of the quantum network of the cryptographic key distribution system according to the second aspect of the present invention can be further expanded by using a repeater network that comprises a plurality of repeater nodes. In any case, the operation of the further expanded system conceptually remains that previously described in relation to the cryptographic key distribution system shown in FIG. 2.

According to the second aspect of the present invention, when a subscriber wishes to communicate with the server node S, for example to request a traffic cryptographic key in order to be able to communicate in a secure manner with another subscriber, he/she can conveniently perform the entire procedure previously described in relation to the generation of a respective link quantum key by using a client node (and possibly one or more repeater nodes) and in relation to the distribution of a traffic cryptographic key, so as to obtain a further traffic cryptographic key that the user can conveniently use to communicate in a secure manner with the server node S.

The cryptographic key distribution system according to the second aspect of the present invention is a hierarchical system where:
  the server node S stores/updates in a database the (generated and distributed) traffic cryptographic keys, the (generated and used) link quantum keys associated with the subscribers, the (generated and used) QKD authentication keys associated with the subscribers that use client nodes connected to said server node S by means of the respective quantum channels, the (generated and used) QKD authentication keys associated with repeater nodes connected to said server node S by means of respective quantum channels and the (generated and used) service authentication keys of the subscribers towards said server node S;
  each repeater node R stores the (generated and used) transfer quantum keys associated with the subscribers that use the nodes connected to said repeater node R by means of respective quantum channels and the (generated and used) QKD authentication keys of said repeater node R towards the nodes connected to said repeater node R by means of respective quantum channels and of the subscribers towards said repeater node R; and
  each subscriber possesses the traffic cryptographic keys he/she has received from the server node S, the respective link quantum keys, the respective service authentication keys towards the server node S and the respective QKD authentication keys towards the server node S and/or towards one or more repeater nodes.

In addition, the server node S monitors the quantum channels directly connected to said server node S in real time so as to set, always in real time, the optimal parameters necessary for quantum communication. In the same way, each repeater node R monitors the quantum channels directly connected to said repeater node R in real time so as to set, again in real time, the optimal parameters necessary for quantum communication.

The cryptographic key distribution system according to the second aspect of the present invention can conveniently comprise a backup server node configured to substitute the main server node S should the latter be unable to operate, for example in the event of a simple failure of the main server node S or in the case of disaster recovery.

In particular, the backup server node can be conveniently configured to:
  store all the initial service authentication keys of the subscribers towards the main server node S and, when activated, utilize these initial service authentication keys of the subscribers towards the main server node S to distribute the traffic cryptographic keys; or
  store respective initial service authentication keys of the subscribers towards said backup server node and, when activated, utilize these respective initial service authentication keys of the subscribers towards said backup server node to distribute the traffic cryptographic keys; or
  periodically synchronize itself with the main server node S so as to store/update all of the traffic cryptographic keys, the link quantum keys and the service authentication keys stored by said main server node S in a respective database, so as to be always aligned with the main server node S with regard to the traffic cryptographic keys, the link quantum keys and the service authentication keys generated and distributed/used.

Furthermore, the following three distribution strategies for link quantum key and traffic cryptographic keys can also be adopted with the cryptographic key distribution system according to the second aspect of the present invention:
  1) every time P (where P>1) subscribers to the cryptographic key distribution system need to communicate with each other in a secure manner, said P subscribers use one or more client nodes (and/or repeater node(s)) to obtain, each, a respective link quantum key that they then use to obtain one and the same traffic cryptographic key from the server node:
  2) a subscriber to the cryptographic key distribution system uses a client (or repeater) node to obtain a plurality of link quantum keys that he/she stores on a respective electronic device (for example on a portable data storage device, such as a USB flash drive or an external USB hard disk drive, or on a desktop computer, or on a portable computer, such as a laptop or tablet, or on a smartphone, etc.), and then uses them one at a time when he/she needs the obtain traffic cryptographic keys from the server node S; by using the stored link quantum keys, said subscriber can obtain the traffic cryptographic keys by means of a client node, or a repeater node, or by means of any electronic communication device able to communicate with the server node S over a public channel; once said subscriber runs out of stored link quantum keys, he/she must use again a client node or a repeater node to obtain further link quantum keys:
  3) P (where P>1) subscribers to the cryptographic key distribution system use one or more client nodes (and/or repeater node(s)) to obtain a plurality of traffic cryptographic keys that they store on respective electronic devices (for example on portable data storage devices, such as USB flash drives or external USB hard disk drives, or on desktop computers, or on portable computers, such as laptops or tablets, or on smartphones, etc.), and then use them when they need to communicate with each other in a secure manner.

Finally, it is important to underline once again the fact that, in order to receive the traffic cryptographic keys, each subscriber to the cryptographic key distribution system according to the present invention can use:
  a respective electronic communications device (for example a desktop computer, a portable computer, a tablet, a smartphone, etc.) that is configured to connect to the server node S by means of one or more public communication channel(s), for example via the Internet, and that comprises a software module configured to communicate with said server node S and perform the previously described OTP and non-OTP decryption operations; and/or
  a client node or a repeater node of the cryptographic key distribution system (which, for example, can receive the traffic cryptographic keys over the public link of the quantum channel that connects it to the server node S, and that conveniently comprises a software module configured to perform the previously described OTP and non-OTP decryption operations).

From the foregoing description, the advantages of the present invention can be immediately appreciated.

In particular, it is important to underline once again the fact that according to the second aspect of the present invention, the repeater node R, even though it knows the link quantum keys of some subscribers, is unable to trace the traffic cryptographic keys thanks to the use of non-OTP encryption based on the current service authentication keys of the subscribers towards the server node S in the distribution of said traffic cryptographic keys. In other words, even if it were in bad faith, the repeater node R would not be able to distribute the traffic cryptographic keys associated with two or more authorized subscribers to other unauthorized users, thereby rendering the communication between said authorized subscribers truly secure. Therefore, the second aspect of the present invention resolves the security problems of the system described in WO 2007/123869 A2.

Furthermore, it is also important to underline the fact that the cryptographic key distribution system according to the present invention, thanks to the use of QKD, OTP encryption and the service authentication keys, if used, enables distributing cryptographic keys to the subscribers without the risk of an unauthorized third party being able to eavesdrop, or rather "steal", these cryptographic keys.

In addition, the cryptographic key distribution system according to the present invention overcomes the drawbacks of known QKD systems. In fact, thanks to the expandable architecture of the quantum network of the cryptographic key distribution system according to the present invention, the following drawbacks are overcome:

the drawback related to the fact that two communication devices must be relatively close to each other, or rather at a distance of a few kilometers, to be able to exploit QKD in order to generate a secure cryptographic key common to both; and the drawback related to the fact of having to set up, for each pair of communication devices, a corresponding quantum channel that connects said devices so as to exploit QKD in order generate a secure cryptographic key common to both.

Finally, it is clear that various modifications can be applied to the present invention without leaving the scope of protection of the invention defined in the appended claims.

The invention claimed is:

1. Cryptographic key distribution system comprising:
a server node (S);
at least a first electronic communication device comprising a processor, a memory, and a first client node (C1) connected to the server node (S) by means of a first quantum channel:
a repeater network comprising a first repeater node (R) connected to the server node (S) by means of a second quantum channel; and
at least a second electronic communication device comprising a second client node (C2) connected to the repeater network by means of a third quantum channel;
wherein the server node (S) and the first client node (C1) are configured to cooperatively generate a first link quantum key associated with a first system subscriber by implementing a quantum key distribution on the first quantum channel;
wherein the first client node (C1) is configured to provide the first subscriber with the first link quantum key;
wherein the repeater network and the second client node (C2) are configured to cooperatively generate a transfer quantum key associated with a second system subscriber by implementing a quantum key distribution on the third quantum channel;
wherein the second client node (C2) is configured to provide the second subscriber with the transfer quantum key;
wherein the server node (S) and the repeater network are configured to cooperatively generate a second link quantum key associated with the second subscriber by implementing a quantum key distribution on the second quantum channel;

wherein the repeater network is further configured to:
encrypt the second link quantum key on the basis of the transfer quantum key; and
send the encrypted second link quantum key to the second subscriber by means of one or more public communication channel(s);
wherein the server node (S) is further configured to:
encrypt a traffic cryptographic key associated with the first and second system subscribers on the basis of the first link quantum key and of a first service authentication key associated with the first subscriber;
send the traffic cryptographic key encrypted on the basis of the first link quantum key and of the first service authentication key to the first subscriber by means of one or more public communication channel(s);
encrypt the traffic cryptographic key associated with the first and second system subscribers on the basis of the second link quantum key and of a second service authentication key associated with the second subscriber;
and send the traffic cryptographic key encrypted on the basis of the second link quantum key and of the second service authentication key to the second subscriber by means of one or more public communication channel(s);
wherein the server node (S) is further configured to:
store a current first service authentication key associated with the first subscriber and a current second service authentication key associated with the second subscriber;
encrypt the traffic cryptographic key associated with the first and second subscribers and a new first service authentication key associated with the first subscriber on the basis of the first link quantum key and of the current first service authentication key;
send the traffic cryptographic key and the new first service authentication key encrypted on the basis of the first link quantum key and of the current first service authentication key to the first subscriber by means of one or more public communication channel(s);
encrypt the traffic cryptographic key, which is associated with the first and second subscribers, and a new second service authentication key, which is associated with the second subscriber, on the basis of the second link quantum key and of the current second service authentication key;
send the traffic cryptographic key and the new second service authentication key encrypted on the basis of the second link quantum key and of the current second service authentication key to the second subscriber by means of one or more public communication channel(s);
and update the current first service authentication key stored in memory with the new first service authentication key and the current second service authentication key stored in memory with the new second service authentication key;
wherein the server node (S) is further configured to
encrypt the traffic cryptographic key and the new first service authentication key by performing a One Time Pad (OTP) encryption of said traffic cryptographic key and said new first service authentication key on the basis of the first link quantum key, thereby obtaining a first encrypted message;
encrypt the first encrypted message on the basis of the current first se ice authentication key, thereby obtaining a second encrypted message;
send the second encrypted message to the first subscriber by means of one or more public communication channel(s);

encrypt the traffic cryptographic key and the new second service authentication key by performing a One Time Pad (OTP) encryption of said traffic cryptographic key and of said new second service authentication key on the basis of the second link quantum key, thereby obtaining a third encrypted message;

encrypt the third encrypted message on the basis of the current second service authentication key, thereby obtaining a fourth encrypted message; and send the fourth encrypted message to the second subscriber by means of one or more public communication channel(s).

2. The system according to claim 1, wherein the first repeater node (R) is connected to the server node (S) by means of the second quantum channel and to the second client node (C2) by means of the third quantum channel;

wherein the first repeater node (R) and the second client node (C2) are configured to cooperatively generate the transfer quantum key associated with the second subscriber by implementing a quantum key distribution on the third quantum channel;

wherein the first repeater node (R) and the server node (S) are configured to cooperatively generate the second link quantum key associated with the second subscriber by implementing a quantum key distribution on the second quantum channel;

and wherein the first repeater node (R) is further configured to:

encrypt the second link quantum key on the basis of the transfer quantum key;

and send the encrypted second link quantum key to the second subscriber by means of one or more public communication channel(s).

3. The system according to claim 1, wherein the repeater network comprises:

a second repeater node connected to the second client node (C2) by means of the third quantum channel and to the first repeater node by means of a fourth quantum channel;

wherein the first repeater node and the server node (S) are configured to cooperatively generate the second link quantum key associated with the second subscriber by implementing a quantum key distribution on the second quantum channel;

wherein the second repeater node and the second client node (C2) are configured to cooperatively generate the transfer quantum key associated with the second subscriber by implementing a quantum key distribution on the third quantum channel;

wherein the first repeater node and the second repeater node are configured to cooperatively generate a further transfer quantum key by implementing a quantum key distribution on the fourth quantum channel;

wherein the first repeater node is further configured to:

encrypt the second link quantum key on the basis of the further transfer quantum key cooperatively generated with the second repeater node;

and send the second link quantum key encrypted on the basis of the further transfer quantum key cooperatively generated with the second repeater node to said second repeater node by means of one or more public communication channel(s);

and wherein the second repeater node is further configured to:

decrypt the encrypted second link quantum key received from the first repeater node on the basis of the further transfer quantum key cooperatively generated with said first repeater node;

encrypt the second link quantum key on the basis of the transfer quantum key associated with the second subscriber;

and send the second link quantum key encrypted on the basis of the transfer quantum key associated with the second subscriber to said second subscriber by means of one or more public communication channel(s).

4. The system according to claim 1, wherein the repeater network comprises:

a second repeater node connected to the second client node (C2) by means of the third quantum channel; and an intermediate repeater node connected to the first repeater node by means of a fourth quantum channel and to the second repeater node by means of a fifth quantum channel;

wherein the first repeater node and the server node (S) are configured to cooperatively generate the second link quantum key associated with the second subscriber by implementing a quantum key distribution on the second quantum channel;

wherein the second repeater node and the second client node (C2) are configured to cooperatively generate the transfer quantum key associated with the second subscriber by implementing a quantum key distribution on the third quantum channel;

wherein the first repeater node and the intermediate repeater node are configured to cooperatively generate a first further transfer quantum key by implementing a quantum key distribution on the fourth quantum channel;

wherein the intermediate repeater node and the second repeater node are configured to cooperatively generate a second further transfer quantum key by implementing a quantum key distribution on the fifth quantum channel;

wherein the first repeater node is further configured to:

encrypt the second link quantum key on the basis of the first further transfer quantum key cooperatively generated with the intermediate repeater node; and send the second link quantum key encrypted on the basis of the first further transfer quantum key cooperatively generated with the intermediate repeater node to said intermediate repeater node by means of one or more public communication channel(s);

wherein the intermediate repeater node is further configured to:

decrypt the encrypted second link quantum key received from the first repeater node on the basis of the first further transfer quantum key cooperatively generated with the first repeater node;

encrypt the second link quantum key on the basis of the second further transfer quantum key cooperatively generated with the second repeater node; and send the second link quantum key encrypted on the basis of the second further transfer quantum key cooperatively generated with the second repeater node to said second repeater node by means of one or more public communication channel(s);

and wherein the second repeater node is further configured to:

decrypt the encrypted second link quantum key received from the intermediate repeater node on the basis of the second further transfer quantum key cooperatively generated with said intermediate repeater node;

encrypt the second link quantum key on the basis of the transfer quantum key associated with the second subscriber; and send the second link quantum key encrypted on the basis of the transfer quantum key associated with the second subscriber to the second subscriber by means of one or more public communication channel(s).

5. The system according to claim 1, wherein the server node (S) is configured to generate the traffic cryptographic keys by operating as a Quantum Random Number Generator (QRNG).

6. The system according, to claim 1, wherein the server node (S) is configured to receive the traffic cryptographic keys from a key generator separate from said server node (S).

7. Cryptographic key distribution system comprising a server node (S) and one or more electronic communication devices, each electronic communication device comprising a processor, a memory, and a client node;
   wherein each client node is connected to the server node (S) by means of a respective quantum channel;
   wherein the server node (S) and each client node are configured to cooperatively generate link quantum keys associated with system subscribers by implementing quantum key distributions on the respective quantum channel;
   wherein each client node is configured to supply a specific system subscriber with a link quantum key cooperatively generated with the server node (S) and associated with said specific subscriber;
   wherein the server node (S) is further configured to:
      encrypt a traffic cryptographic key associated with a first and a second system subscriber on the basis of a first link quantum key associated with the first subscriber;
      send the traffic cryptographic key encrypted on the basis of the first link quantum key to the first subscriber by means of one or more public communication channel(s);
      encrypt the traffic cryptographic key associated with the first and second system subscribers on the basis of a second link quantum key associated with the second subscriber;
      and send the traffic cryptographic key encrypted on the basis of the second link quantum key to the second subscriber by means of one or more public communication channel(s);
   wherein the server node (S) is further configured to:
      encrypt the traffic cryptographic key associated with the first and second system subscribers on the basis of the first link quantum key and of a first service authentication key associated with the first subscriber;
      send the traffic cryptographic key encrypted on the basis of the first link quantum key and of the first service authentication key to the first subscriber by means of one or more public communication channel(s);
      encrypt the traffic cryptographic key associated with the first and second system subscribers on the basis of the second link quantum key and of a second service authentication key associated with the second subscriber; and
      send the traffic cryptographic key encrypted on the basis of the second link quantum key and of the second service authentication key to the second subscriber by means of one or more public communication channel(s);
   wherein the server node (S) is further configured to:
      store a current first service authentication key associated with the first subscriber and a current second service authentication key associated with the second subscriber;
      encrypt the traffic cryptographic key, which is associated with the first and second subscribers, and a new first service authentication key, which is associated with the first subscriber, on the basis of the first link quantum key and of the current first service authentication key;
      send the traffic cryptographic key and the new first service authentication key encrypted on the basis of the first link quantum key and of the current first service authentication key to the first subscriber by means of one or more public communication channel(s);
      encrypt the traffic cryptographic key, which is associated with the first and second subscribers, and a new second service authentication key, which is associated with the second subscriber, on the basis of the second link quantum key and of the current second service authentication key;
      send the traffic cryptographic key and the new second service authentication key encrypted on the basis of the second link quantum key and of the current second service authentication key to the second subscriber by means of one or more public communication channel(s); and
      update the current first service authentication key stored in memory with the new first service authentication key and the current second service authentication key stored in memory with the new second service authentication key;
   wherein the server node (S) is further configured to:
      encrypt the traffic cryptographic key and the new first service authentication key by performing a One Time Pad (OTP) encryption of said traffic cryptographic key and said new first service authentication key on the basis of the first link quantum key, thereby obtaining a first encrypted message;
      encrypt the first encrypted message on the basis of the current first service authentication key, thereby obtaining a second encrypted message;
      send the second encrypted message to the first subscriber by means of one or more public communication channel(s);
      encrypt the traffic cryptographic key and the new second service authentication key by performing a One Time Pad (OTP) encryption of said traffic cryptographic key and said new second service authentication key on the basis of the second link quantum key, thereby obtaining a third encrypted message;
      encrypt the third encrypted message on the basis of the current second service authentication key thereby obtaining a fourth encrypted message; and
      send the fourth encrypted message to the second subscriber by means of one or more public communication channel(s).

8. The system of claim 7, wherein the server node (S) configured to:
   encrypt the traffic cryptographic key associated with the first and second system subscribers on the basis of the first link quantum key by performing a One Time Pad (OTP) encryption of said traffic cryptographic key on the basis of said first link quantum key; and
   encrypt the traffic cryptographic key associated with the first and second system subscribers on the basis of the second link quantum key by performing a One Time Pad (OTP) encryption of said traffic cryptographic key on the basis of said second link quantum key.

9. The system according to claim 7, wherein the server node (S) is configured to generate the traffic cryptographic keys by operating as a Quantum Random Number Generator (QRNG).

10. The system according to claim 7, wherein the server node (S) is configured to receive the traffic cryptographic keys from a key generator separate from said server node (S).

* * * * *